(12) United States Patent
Wright et al.

(10) Patent No.: US 7,238,228 B2
(45) Date of Patent: Jul. 3, 2007

(54) MAGENTA METAL CHELATE DYES AND THEIR USE IN INK-JET PRINTERS

(75) Inventors: Gavin Wright, Manchester (GB); Peter Gregory, Bolton (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 10/550,392

(22) PCT Filed: Mar. 15, 2004

(86) PCT No.: PCT/GB2004/001088

§ 371 (c)(1),
(2), (4) Date: Sep. 22, 2005

(87) PCT Pub. No.: WO2004/087814

PCT Pub. Date: Oct. 14, 2004

(65) Prior Publication Data

US 2006/0180050 A1 Aug. 17, 2006

(30) Foreign Application Priority Data

Apr. 2, 2003 (GB) .................................. 0307695.7

(51) Int. Cl.
*C09D 11/00* (2006.01)
*C09D 11/02* (2006.01)
*C09B 45/00* (2006.01)

(52) U.S. Cl. ............................ 106/31.48; 106/31.46; 106/31.5; 106/31.76; 106/31.77; 106/31.78; 106/31.79; 534/706

(58) Field of Classification Search ............ 106/31.46, 106/31.48, 31.5, 31.76, 31.77, 31.78, 31.79; 534/706
See application file for complete search history.

(56) References Cited

U.S. PATENT DOCUMENTS

| | | | | |
|---|---|---|---|---|
| 4,001,203 A * | 1/1977 | Back et al. | .................. | 534/620 |
| 4,113,717 A * | 9/1978 | Parton | ........................ | 534/610 |
| 4,420,550 A * | 12/1983 | Evans et al. | ................ | 430/223 |
| 5,330,542 A * | 7/1994 | Maeda et al. | .................. | 8/639 |
| 5,980,622 A * | 11/1999 | Byers | ..................... | 106/31.48 |
| 6,001,161 A | 12/1999 | Evans et al. | ............ | 106/31.48 |
| 6,712,890 B2 * | 3/2004 | Hadjisoteriou et al. | .. | 106/31.47 |
| 6,869,646 B2 * | 3/2005 | Deardurff et al. | ........ | 428/32.17 |
| 6,969,421 B2 * | 11/2005 | Wright et al. | .............. | 106/31.5 |
| 6,979,364 B2 * | 12/2005 | Wright et al. | .............. | 106/31.5 |
| 7,041,809 B2 * | 5/2006 | Beach et al. | ................ | 534/765 |
| 7,094,280 B2 * | 8/2006 | Shimizu et al. | .......... | 106/31.46 |
| 7,097,700 B2 * | 8/2006 | Shimizu | ................... | 106/31.46 |
| 7,147,697 B2 * | 12/2006 | Foster et al. | ............. | 106/31.48 |
| 7,150,782 B2 * | 12/2006 | Foster et al. | ............. | 106/31.46 |
| 2003/0088077 A1 * | 5/2003 | Yamada et al. | ............ | 534/707 |
| 2003/0125530 A1 * | 7/2003 | Chino et al. | ................ | 534/653 |
| 2006/0150861 A1 * | 7/2006 | Foster et al. | ............. | 106/31.48 |
| 2006/0152565 A1 * | 7/2006 | Foster et al. | ................ | 347/100 |

FOREIGN PATENT DOCUMENTS

| | | | |
|---|---|---|---|
| DE | 3713624 | * | 11/1987 |
| EP | 902 064 | | 3/1999 |
| EP | 1 241 232 | | 9/2002 |
| EP | 1 270 676 | | 9/2002 |
| WO | 2004/007622 | | 1/2004 |

OTHER PUBLICATIONS

Chemical Abstracts, vol. 61, No. 7141, Sep. 14, 1964, H. Iida et al. : "Metal Complex Dyes I. Copper complexes of azo dyes prepared by using 8-aminoquinoline as a diazo component" XP002284432.
Chemical Abstracts, vol. 97, No. 18, Nov. 1, 1982, abstracts No. 146200q, S.H. Etaiw et al. "Studies on azo-compound. Part V. Spectrophotometric studies on some quinoline azo dyes" p. 74 col. 1 XP002284433.
Chemical Abstract, vol. 89, No. 14, Oct. 2, 1978 abstract No. 112270g F. Abdel-Hay et al. Kolor Ert., vol. 19, No. 6, 1977, pp. 365-372.

* cited by examiner

*Primary Examiner*—Helene Klemanski
(74) *Attorney, Agent, or Firm*—Morgan Lewis & Bockius LLP

(57) ABSTRACT

A metal chelate of Formula (1) or salt thereof. Formula (1) wherein: $R^1$ and $R^2$ are each independently H or an organic group; M is a metal; p is 1 to 4; Y is an optionally substituted heterocyclic ring with a nitrogen ortho to the azo bridge; G is a substituent; and n is 0 to 5. Also inkjet inks, cartridges and processes

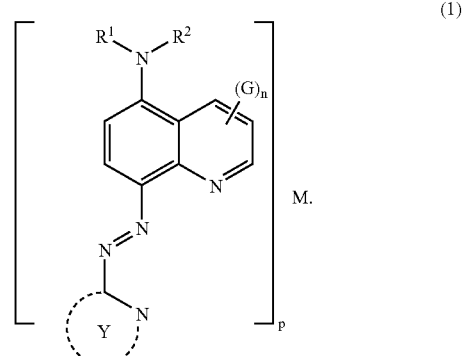

14 Claims, No Drawings

MAGENTA METAL CHELATE DYES AND THEIR USE IN INK-JET PRINTERS

This invention relates to metal chelates, to compositions containing these metal chelates, to inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate.

There are many demanding performance requirements for dyes and inks used in ink-jet printing. For example they desirably provide sharp, non-feathered images having good water light and ozone fastness and optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate that could block the fine nozzle.

Colour ink-jet printers typically use four inks of differing hues: magenta, yellow, cyan, and black. Colours other than these may be obtained using differing combinations of these inks. Thus, for optimum print quality, the colourants used must be able to form an ink with a specific precise hue. This can be achieved by mixing colourants but is advantageously achieved by used a single colourant with the exact hue required.

Furthermore, the resultant images desirably do not fade rapidly on exposure to light or common oxidising gases such as ozone.

This invention relates to new magenta colorants able to be used in inks and meet the demanding technical requirements of ink-jet printing.

According to the present invention there is provided a metal chelate of Formula (1) or salt thereof:

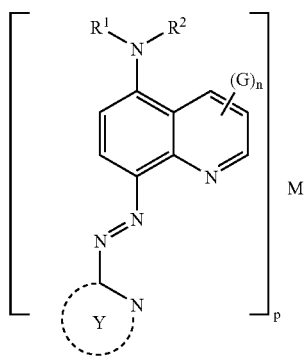

Formula (1)

wherein:
$R^1$ and $R^2$ are each independently H or an organic group;
M is a metal;
p is 1 to 4;
Y is an optionally substituted heterocyclic ring with a nitrogen ortho to the azo bridge;
G is a substituent; and
n is 0 to 5.

M may be any metal suitable for use in an ink-jet printing process. The major factor in the suitability of a metal for an ink-jet printing process is the tendency of some metals to form precipitates on long term storage and block the nozzles in an ink-jet printing head.

M is preferably a transition metal. More preferably M is selected from nickel, cobalt, copper, zinc and chromium. It is especially preferred that M is nickel, particularly $Ni^{2+}$.

Preferably p is 2.

When p is greater than 1 the metal ligands in the metal chelate of Formula (1) may be the same or different but preferably they are the same.

The metal chelate of Formula (1) may also comprise 1 or more additional ligands. These ligands may be coloured or colourless and when there is more than 1 they may be the same or different.

$R^1$ and $R^2$ are preferably independently H, optionally substituted alkyl, optionally substituted alkenyl, optionally substituted alkynyl, optionally substituted aryl or an optionally substituted heterocycle. More preferably $R^1$ and $R^2$ are independently H, optionally substituted alkyl (especially $C_{1-4}$-alkyl), optionally substituted aryl (especially phenyl) or a combination thereof.

When $R^1$ and $R^2$ are optionally substituted alkyl, optionally substituted alkenyl, optionally substituted alkynyl then $R^1$ and $R^2$ may each independently be a linear, branched or cyclic radical.

In a preferred embodiment one of $R^1$ and $R^2$ is H and the other is optionally substituted phenyl or optionally substituted $C_{1-4}$-alkyl.

In another preferred embodiment $R^1$ and $R^2$ are both optionally substituted $C^{1-4}$-alkyl more preferably $R^1$ and $R^2$ are both methyl.

Optional substituents for $R^1$ and $R^2$ are preferably selected from: optionally substituted alkyl (preferably $C_{1-4}$-alkyl), optionally substituted alkoxy (preferably $C_{1-4}$-alkoxy), optionally substituted aryl (preferably phenyl), optionally substituted aryloxy (preferably phenoxy), polyalkylene oxide (preferably polyethylene oxide or polypropylene oxide), carboxy, phosphate, sulpho, nitro, cyano, halo, ureido, —$SO_2F$, hydroxy, ester, —$NR^4R^5$, —$COR^4$, —$CONR^4R^5$, —$NHCOR^4$, carboxyester, sulphone, and —$SO_2NR^4R^5$ wherein $R^4$ and $R^5$ are each independently H or optionally substituted alkyl (especially $C_{1-4}$-alkyl) or, in the case of —$CONR^4R^5$ and —$SO_2NR^4R^5$, $R^4$ and $R^5$ together with the nitrogen atom to which they are attached represent an aliphatic or aromatic ring system; or a combination thereof. Optional substituents for any of the substituents described for $R^1$ and $R^2$ may be selected from the same list of substituents.

When one of $R^1$ and $R^2$ is optionally substituted phenyl then preferably the optional substituent is selected from: carboxy, phosphate, sulpho, nitro or cyano, especially carboxy.

The heterocyclic ring Y may contain further hetero atoms in addition to the nitrogen which is ortho to the azo bridge.

Preferably Y is a 5 or 6 membered ring.

Examples of preferred ring systems include triazole, pyridine, thiazole, thiadiazole, imidazole, pyrazole, pyrrole, pyrrolidine, pyrroline, pyrimidine, pyridazine, imidazolidine, imidazoline, pyrazolidine, pyrazoline, piperidine, piperazine, thiazolidine, morpholino, triazine, oxazole.

Particularly preferred ring systems include triazole, pyridine, pyrazole and thiadiazole (especially 1,3,4 thiadiazole). Optional substituents on Y are independently selected from those described and preferred for $R^1$ and $R^2$.

The optional substituents G are independently selected from those described and preferred for $R^1$ and $R^2$.

In a preferred embodiment at least one of $R^1$, $R^2$, Y or G bears at least one carboxy group.

The metal chelates of Formula (1) may be either neutral or bear a charge. If the metal chelate is charged it is preferably in the form of a salt.

The metal chelates of Formula (1) may exist in tautomeric forms other than those shown in this specification. These tautomers are included within the scope of the present invention.

The metal chelates of Formula (1) may be prepared using conventional techniques.

For example a suitable method comprises adding together a solution of a metal salt to a solution of the ligand of Formula (1).

The metal ligands comprised in Formula (1) may be prepared, for example, by condensing 5-amino quinoline with $R^1$ and $R^2$ followed by the reaction with the diazonium salt of an amino analogue of the desired heterocycle ring Y.

The diazotisation is preferably performed at a temperature below 6° C., more preferably at a temperature in the range −10° C. to 5° C. Preferably the diazotisation is performed in water, preferably at a pH below 7. Dilute mineral acid, e.g. HCl or $H_2SO_4$, are often used to achieve the desired acidic conditions. Depending on the analogue to be made suitable removable protecting and or activating groups may be utilized in the synthesis.

The metal chelates according to the first aspect of the invention have attractive, strong magenta shades and are valuable colourants for use in ink-jet printing. They benefit from a good balance of solubility, storage stability and fastness to water and light. In particular they have an excellent hue for colour ink-jet printing and when printed display good light and ozone fastness.

According to a second aspect of the present invention there is provided a composition comprising a metal chelate of Formula (1) as described in the first aspect of the invention and a liquid medium.

Preferred compositions comprise:
(a) from 0.01 to 30 parts of a metal chelate according to the first aspect of the invention; and
(b) from 70 to 99.99 parts of a liquid medium;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

Preferred liquid media include water, a mixture of water and organic solvent and organic solvent free from water.

When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_1$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols.

In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected that gives good control over the drying characteristics and storage stability of the ink.

Liquid media comprising an organic solvent free from water are particularly useful where fast drying times are required and particularly when printing onto hydrophobic and non-absorbent substrates, for example plastics, metal and glass.

The liquid media may also contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I.Direct Yellow 86, 132, 142 and 173; C.I.Direct Blue 199, and 307; C.I.Food Black 2; C.I.Direct Black 168 and 195; C.I.Acid Yellow 23; and any of the dyes used in ink-jet printers sold by Seiko Epson Corporation, Hewlett Packard Company, Canon Inc. & Lexmark International. Addition of such further dyes can increase overall solubility leading to less kogation (nozzle blockage) for the resultant ink.

Preferably the composition is an ink-jet printing ink or a liquid dye concentrate. Concentrates are useful as a means for transporting colorant and so minimising costs associated with drying the dye and transporting excess liquid.

Thus, compositions according to the second aspect of the invention are preferably prepared using high purity ingredients and/or by purifying the composition after it has been prepared. Suitable purification techniques are well known, e.g. ultrafiltration, reverse osmosis, ion exchange and combinations thereof (either before or after they are incorporated in a composition according to the present invention). This purification results in the removal of substantially all of the inorganic salts and by-products resulting from its synthesis. Such purification assists in the preparation of a low viscosity aqueous solution suitable for use in an ink-jet printer.

Preferably the composition has a viscosity of less than 20 cP, more preferably less than 10 cP, especially less than 5 cP, at 25° C. These low viscosity inks are particularly well suited for application to substrates by means of ink-jet printers.

Preferably the composition contains less than 500 ppm, more preferably less than 250 ppm, especially less than 100 pm, more especially less than 10 ppm in total of divalent and trivalent metal ions (other than any divalent and trivalent metal ions bound to a component of the composition).

Preferably the composition has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Preferably the composition contains less than 500 ppm, more preferably less than 250 ppm, especially less than 100 pm, more especially less than 10 ppm in total of halide ions.

In a particularly preferred embodiment of the second aspect of the present invention the composition is an ink-jet printing ink that has a viscosity of less than 20 cP at 25° C.; contains less than 500 ppm in total of divalent and trivalent metal ions (other than any divalent and trivalent metal ions bound to a component of the ink); contains less than 500 ppm halide ions; and has been filtered through a filter having a mean pore size below 10 µm.

A third aspect of the invention provides a process for forming an image on a substrate comprising applying an ink according to the second aspect of the invention thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electro-mechanical actuator connected to a moveable paddle or plunger, for example as described in International Patent Application 00/48938 and International Patent Application 00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. More especially photographic quality paper is preferred.

A fourth aspect of the present invention provides a material, preferably paper, plastic, a textile, metal or glass, more preferably paper, an overhead projector slide or a textile material, especially paper more especially plain, coated or treated papers printed with a composition as described in the second aspect of the invention, a metal chelate as described in the first aspect of the invention or by means of a process as described in the third aspect of the invention.

It is especially preferred that the fourth aspect of the invention is a photographic quality print.

A fifth aspect of the present invention provides an ink-jet printer cartridge comprising a chamber and an ink wherein the ink is in the chamber and the ink is as defined in the second aspect of the present invention.

The invention is further illustrated by the following Examples in which all parts and percentages are by weight unless otherwise stated.

EXAMPLE 1

Preparation of an Ink Containing Compound (1)

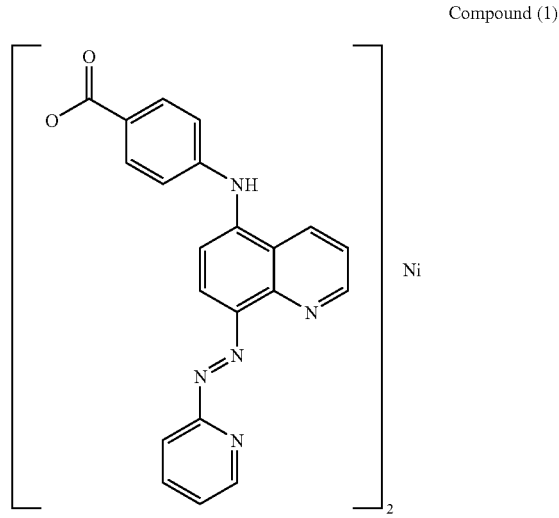

Compound (1)

Stage (a): Preparation of
4-(quinolin-5-ylamino)-benzoic Acid Methyl Ester

5-Aminoquinoline (14.4 g, 0.10 mol), methyl 4-bromobenzoate (21.6 g, 0.10 mol), Cs$_2$CO$_3$ (45.6 g, 0.14 mol), rac-2,2'-bis(diphenylphosphino)-1,1'-binaphthyl (0.96 g, 1.5 mmol) and tris(dibenzylideneacetone)dipalladium (0) (0.44 g, 0.5 mmol) were mixed in toluene (15 ml) and stirred at 100° C. for 170 h. At the end of this time the reaction mixture was screened and the filtrates were evaporated under reduced pressure. The resultant residue was purified by column chromatography on silica gel eluting with a (1:1) mixture of hexane and ethyl acetate. The elute was collected and the solvent was removed under reduced pressure to yield the product (contaminated with a small amount of 5-aminoquinoline) which was used in the next stage without further purification.

Stage (b): Preparation of
4-(quinolin-5-ylamino)-benzoic Acid

A solution of sodium hydroxide (7 g, 0.18 mol) in water (100 ml) was added to a solution of the product from stage (a) in a mixture of tetrahydrofuran (100 ml) and methanol (350 ml). The reaction mixture was stirred at 50° C. for 3 h before the solvent was removed under reduced pressure. The resultant residue was purified by dissolving in water (1000 ml) adjusted to pH10 with 2M NaOH and precipitating the crude product by acidification to pH3 with 2N HCl. The precipitate so formed was collected by filtration and washed with water (250 ml). This purification procedure was repeated a further two times before the product was dried to give 12.3 g of an orange powder.

Stage (c)

Preparation of

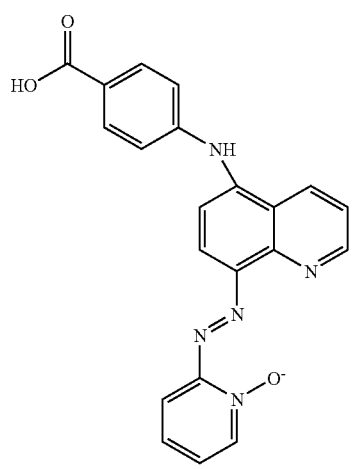

A solution of sodium nitrite (1.52 g, 0.02 mol) in water (20 ml) was added dropwise to a solution of 2-aminopyridine N-oxide (2.36 g, 0.02 mol) in a mixture of water (20 ml) and concentrated HCl (10 ml) at 0-5° C. The reaction mixture was stirred for 1 h at 0-5° C. and then excess nitrous acid was destroyed by the addition of a small amount of sulfamic acid. A solution of the product from stage (b) (2.64 g, 0.02 mol) in a mixture of water (50 ml) and N-methylpyrrolidone (50 ml) was adjusted to pH 9 to 10 with 2M NaOH. This solution was then added slowly to the above diazonium solution at 0-5° C. The reaction mixture was stirred at room temperature for 18 h and then was added to water (200 ml) resulting in the formation of a precipitate which was collected by filtration and dried to give 3.5 g of a brown solid.

Stage (d)

Preparation of

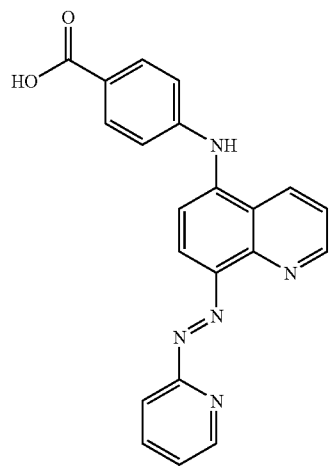

Dimethysulfate (5 ml, 0.05 mol) was added to a suspension of the product from stage (c) (4.5 g, 0.01 mol) in N-methylpyrrolidone (25 ml). The reaction mixture was stirred at room temperature for 2 h and then added to diethyl ether (300 ml) and the resultant precipitate collected by filtration. The filtrate was stirred in acetone (300 ml) collected by filtration and dried. A suspension of this solid in a mixture of concentrated ammonia solution (20 ml) and ethanol (250 ml) was stirred at reflux for 2 h. The solvent was then removed under reduced pressure. The resultant residue was dissolved in water (300 ml) and the product was precipitated by the addition of concentrated HCl to pH 6. The precipitate was collected by filtration and dried to give 0.43 g of a brown solid.

Stage (e)

Preparation of an Ink Containing the Title Product

Nickel acetate tetrahydrate (0.04 g, 0.14 mmol) was added to a solution of the product from stage (d) (0.10 g, 0.27 mmol) in a mixture of 2-pyrrolidone (0.5 g), thiodiglycol (0.5 g), Surfynol™ 465(0.1 g) and water (8.55 g). The pH of the ink was adjusted to pH8 with 1N NaOH. This reaction mixture was stirred for 2 h at room temperature to give a solution of the metal complex dye in an ink.

EXAMPLE 2

Preparation of an Ink Containing Compound (2)

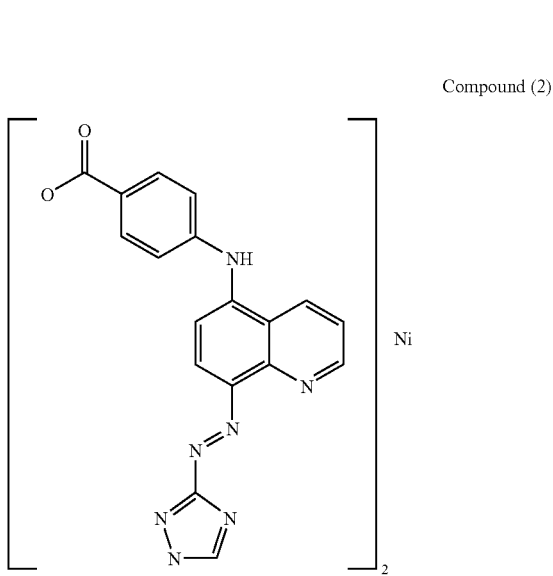

Compound (2)

The ink containing compound (2) was prepared using an analogous process to that described in Example (1) except that in stage (c) 3-amino-1,2,4-triazole was used in place of 2-aminopyridine N-oxide. Stage (d) was not performed.

EXAMPLE 3

Preparation of an Ink Containing Compound (3)

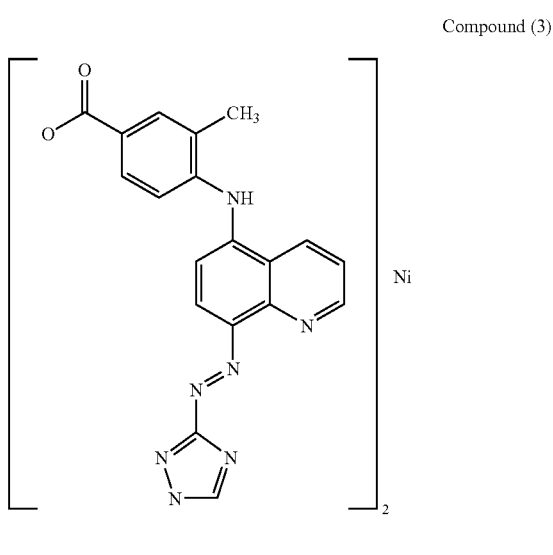

Compound (3)

An ink containing compound (3) was prepared using an analogous process to that described in Example (1) except that in stage (a) methyl 2-methyl-4-bromobenzoate was used in place of methyl 4-bromobenzoate and in stage (c) 3-amino-1,2,4-triazole was used in place of 2-aminopyridine N-oxide. Stage (d) was not performed.

EXAMPLE 4

Preparation of Compound (4)

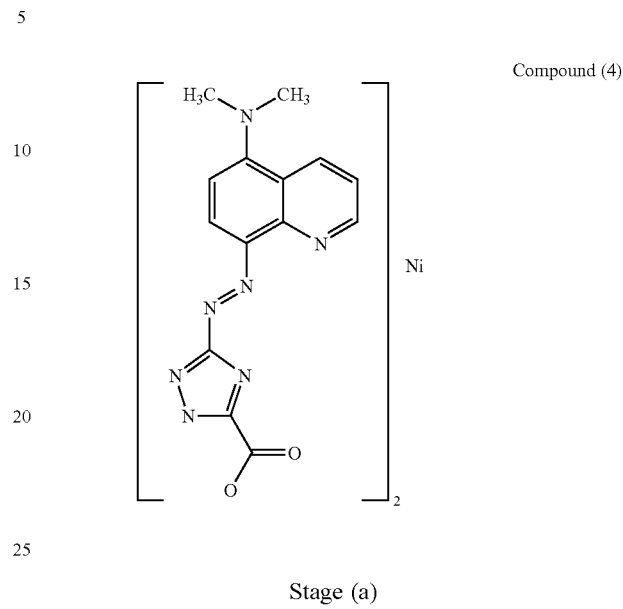

Compound (4)

Stage (a)

Preparation of dimethyl-quinolin-5-yl-amine

A mixture of 5-aminoquinoline (5 g, 0.03 mol), ortho-phosphoric acid (100 ml) and methanol (5 ml) was heated slowly to 150° C. The mixture was stirred at 150° C. for 24 h, adding additional methanol (1 ml) every hour. At the end of this time the reaction mixture was allowed to cool to 20° C. and then added to ice/water (1500 ml) and the pH adjusted to 7 by the addition of 48% sodium hydroxide solution. The product was extracted with dichloromethane (3×100 ml) and the combined extracts were washed with water (250 ml) and dried over $MgSO_4$. The solvent was removed under reduced pressure and the residue was purified by distillation to give 2.5 g of a yellow liquid.

Stage (b)

Preparation of

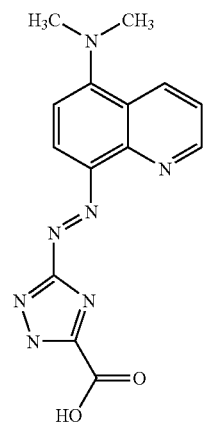

The above compound was prepared using an analogous process to that described in Example (1) stage (c) except that the product from Example (4) stage (a) was used in place of 4-(quinolin-5-ylamino)benzoic acid and 3-amino-1,2,4-biazole-5-carboxylic acid was used in place of 2-aminopyridine N-oxide.

Stage (c)

Preparation of the Title Compound

A solution of nickel acetate tetrahydrate (0.2 g, 0.8 mmol) in water (2 ml) was added to a suspension of the product from stage (b) (0.5 g, 1.6 mmol) in NN-dimethylformamide (5 ml). The reaction mixture was stirred for 1 h at 75° C. At the end of this time the solvent was evaporated under reduced pressure and the residue was stirred in acetonitrile (5 ml) at reflux for 10 min. The suspension was cooled in ice/water, the product was collected by filtration, washed with a mixture of acetonitrile (2.5 ml) and water (5 ml) and dried to give 0.5 g of a black solid ($\lambda_{max}$ (in water)=550).

EXAMPLE 5

Preparation of Compound (5)

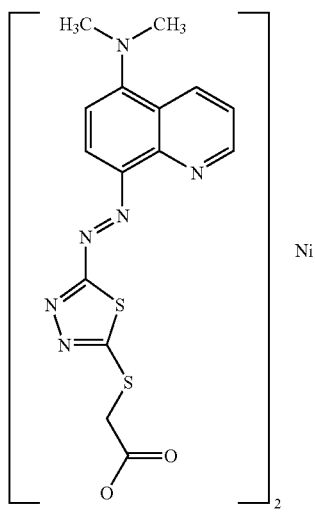

Compound (5)

Compound (5) was prepared using an analogous process to that described in Example (4) except that in stage (b) (5-amino-[1,3,4]thiadiazol-2-ylsulfanyl)-acetic acid was used in place of 3-amino-1,2,4-triazole-5-carboxylic acid. The product had a $\lambda_{max}$ in water of 538 nm.

EXAMPLE 6

Preparation of Compound (6)

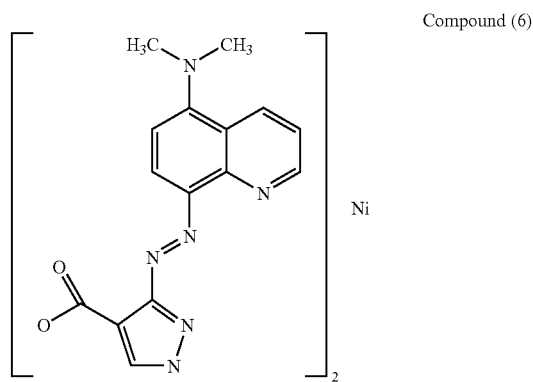

Compound (6)

Compound (6) was prepared using an analogous process to that described in Example (4) except that in stage (b) 3-amino-1H-pyrazole-4-carboxylic acid was used in place of 3-amino-1,2,4-triazole-5-carboxylic acid.

EXAMPLE 7

Preparation of Compound (7)

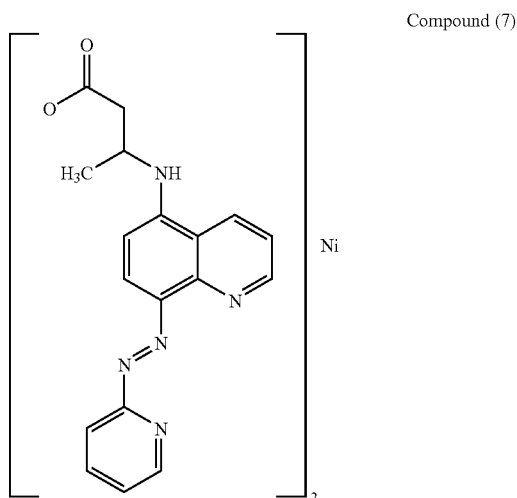

Compound (7)

Stage (a)

Preparation of 3-(quinolin-5-ylamino)-butyric Acid

A mixture of 5-aminoquinoline (9.9 g, 0.069 mol) and crotonic acid (8.9 g, 0.103 mol) in toluene (35 ml) was stirred at reflux for 48 h. The reaction mixture was allowed to cool to ambient, added to water (500 ml) and the pH adjusted to 9 to 10 by the addition of 2N sodium hydroxide. The reaction mixture was screened and the filtrate extracted with diethyl ether (3×100 ml). The pH of the aqueous layer was first adjusted to pH2 with concentrated HCl and then to pH7 with calcium hydroxide. The precipitate which formed was collected by filtration, washed first with water (200 ml) and then with acetone (200 ml) before being dried to give 8.1 g of a cream solid.

Stage (b)

Preparation of

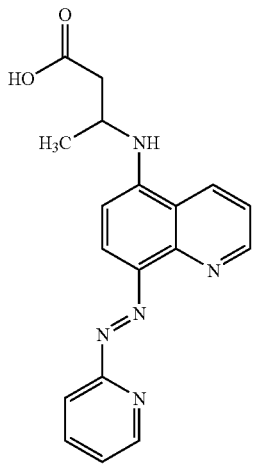

The above compound was prepared using an analogous process to that described in Example (1) stages (b) and (c) except that in stage (c) 3-(quinolin-5-ylamino)-butyric acid (the product from Example (7) stage (a)) was used in place of 4-(quinolin-5-ylamino) benzoic acid.

Stage (c)

Preparation of the Title Compound

A solution of nickel acetate tetrahydrate (0.33 g, 1.3 mmol) in water (5 ml) was added to a suspension of the product from stage (b) (0.88 g, 2.6 mmol) in NN-dimethylformamide (20 ml). This mixture was stirred for 1 h at 40 to 50° C. and evaporated under reduced pressure. The resultant residue was dissolved in water (200 ml) and adjusted to pH7 with 2N NaOH. This solution subjected to membrane filtration with a filter having a 3500 molecular weight cut off and then evaporated to give 0.61 g of the product as a dark green powder.

EXAMPLE 8

Preparation of an Ink Containing Compound (8)

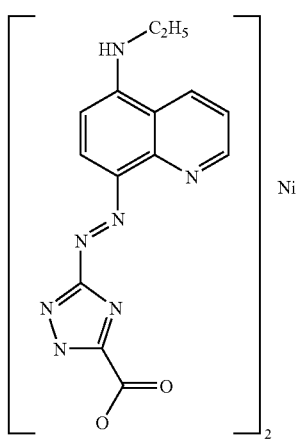

Compound (8)

Stage (a)

Preparation of ethylquinolin-5-yl-amine

A mixture of 5-aminoquinoline (7.2 g, 0.05 mol), acetaldehyde (2.6 g, 0.06 mol) and 4-thiocresol (6.8 g, 0.055 mol) in ethanol (100 ml) was stirred at reflux for 4 h. The reaction mixture was evaporated under reduced pressure and the residue dissolved in ethanol (100 ml). Sodium borohydride (10 g) was then added to the reaction mixture in portions maintaining the temperature below 5° C. This reaction mixture was stirred at reflux for 2 h and cooled to room temperature. Water (40 ml) was then added and the mixture was stirred for a further 25 min at reflux. The pH of the mixture was then adjusted to pH8 with 2N NaOH and the product was extracted with dichloromethane (4×100 ml). The dichloromethane extracts were combined and washed with water (250 ml) before being dried over MgSO$_4$. The solvent was then removed under reduced pressure and the residue was purified by column chromatography on silica gel eluting with ethyl acetate in hexane. The solvent in the eluent was evaporated to give 5.4 g of a yellow solid which was used without further purification.

Stage (b)

Preparation of

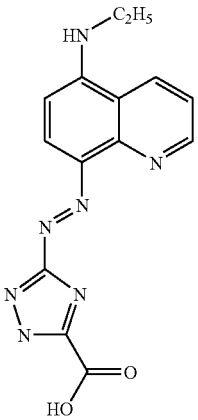

The above compound was prepared using an analogous process to that described in Example (1) stage (c) except that the product from Example (8) stage (a) was used in place of 4-(quinolin-5-ylamino)-benzoic acid and 3-amino-1,2,4-triazole-5-carboxlic acid was used in place of 2-aminopyridine N-oxide.

Stage (c)

Preparation of an Ink Containing Compound (8)

Nickel acetate tetrahydrate (0.04 g, 0.14 mmol) was added to a solution of the product from stage (d) (0.10 g, 0.32 mmol) in a mixture of in 2-pyrrolidone (0.5 g), thiodiglycol (0.5 g), Surfynol™ 465(0.1 g) and water (8.55 g). The pH of the ink was adjusted to pH8 with 1N NaOH. This reaction mixture was stirred for 2 h at room temperature to give a solution of the metal complex dye in an ink.

EXAMPLE 9

Preparation of Inks 4, 5, 6 and 7

Inks 4, 5, 6 and 7 were prepared by dissolving the corresponding compounds of Examples 4 to 7 (3.5%) in a liquid medium consisting of 2-pyrrolidone/thiodiglycol/Surfynol™ 465 in a weight ratio of 5:5:1.

EXAMPLE 10

Ink-Jet Printing

Inks 4, 5 and 7 were ink-jet printed onto SEC Premium Photo paper using a Hewlett Packard DeskJet 550C™. The Chroma of the prints were measured using a Xrite 983™ Spectrodensitometer with 0°/45° measuring geometry with a spectral range of 400-700 nm at 20 nm spectral intervals, using illuminant C with a 2° (CIE 1931) observer angle and a density operation of status T. No less than 2 measurements were taken diagonally across a solid colour block on the print with a size greater than 10 mm×10 mm.

TABLE 1

| Ink | Chroma |
|---|---|
| Ink 4 | 77.6 |
| Ink 5 | 68.8 |
| Ink 7 | 90.6 |

Further Inks

The inks described in Tables A and B may be prepared wherein the Dye described in the first column is the compound made in the above Example of the same number. Numbers quoted in the second column onwards refer to the number of parts of the relevant ingredient and all parts are by weight. The inks may be applied to paper by ink-jet printing.

The following abbreviations are used in Tables A and B:

PG=propylene glycol
DEG=diethylene glycol
NMP=N-methylpyrollidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol

TABLE A

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 1 | 3.1 | 86 | 5 | | | | | 0.2 | 4 | | | 5 |
| 1 | 1.1 | 81 | | | 9 | | 0.5 | 0.5 | | | 9 | |
| 2 | 2.5 | 60 | 4 | 15 | 3 | 3 | | | 6 | 10 | 5 | 4 |
| 3 | 5 | 65 | | 20 | | | | | 10 | | | |
| 4 | 2.4 | 75 | 5 | 4 | | 5 | | | | 6 | | 5 |
| 1 | 4.1 | 80 | 3 | 5 | 2 | 10 | | 0.3 | | | | |
| 1 | 3.2 | 65 | | 5 | 4 | 6 | | | 5 | 4 | 6 | 5 |
| 2 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 3 | 1.8 | 80 | | | 5 | | | | | | 15 | |
| 4 | 2.6 | 84 | | | 11 | | | | | | 5 | |
| 1 | 3.3 | 80 | 2 | | | 10 | | | | 2 | | 6 |
| 1 | 12.0 | 90 | | | 7 | | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE B

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | | 6 | 4 | | | | 0.12 | | |
| 1 | 3.1 | 82 | 4 | 8 | | | 0.3 | | | | | 6 |
| 1 | 0.9 | 85 | | 10 | | | | | 5 | 0.2 | | |
| 2 | 8.0 | 90 | | 5 | 5 | | | 0.3 | | | | |
| 3 | 4.0 | 70 | | 10 | 4 | | | | 1 | | 4 | 11 |
| 4 | 2.2 | 75 | 4 | 10 | 3 | | | | 2 | | 6 | |

TABLE B-continued

| Example | Dye Content | Water | PG | DEG | NMP | CET | TBT | TDG | BDL | PHO | 2P | PI2 |
|---|---|---|---|---|---|---|---|---|---|---|---|---|
| 1 | 10.0 | 91 | | | 6 | | | | | | 3 | |
| 1 | 9.0 | 76 | | 9 | 7 | | 3.0 | | | 0.95 | 5 | |
| 1 | 5.0 | 78 | 5 | 11 | | | | | | | 6 | |
| 2 | 5.4 | 86 | | | 7 | | | | | | 7 | |
| 3 | 2.1 | 70 | 5 | 5 | 5 | 0.1 | 0.2 | 0.1 | 5 | 0.1 | 5 | |
| 4 | 2.0 | 90 | | 10 | | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | | | 8 | | 12 |
| 1 | 10 | 80 | | 10 | | | | | | | | |

The invention claimed is:

1. A metal chelate of Formula (1) or salt thereof:

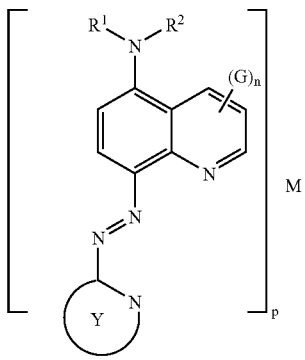

Formula (1)

wherein:
$R^1$ and $R^2$ are each independently H or an organic group;
M is a metal;
p is 1 to 4;
Y is an optionally substituted heterocyclic ring with a nitrogen ortho to the azo bridge;
G is a substituent; and
n is 0 to 5.

2. A metal chelate according to claim 1 wherein M is selected from nickel, cobalt, copper, zinc and chromium.

3. A metal chelate according to either claim 1 or claim 2 wherein M is nickel.

4. A metal chelate according to claim 1 or claim 2 wherein p is 2.

5. A metal chelate according to claim 1 or claim 2 wherein one of $R^1$ and $R^2$ is H and the other is optionally substituted phenyl or optionally substituted $C_{1-4}$-alkyl.

6. A metal chelate according to claim 1 or claim 2 wherein $R^1$ and $R^2$ are both methyl.

7. A metal chelate according to claim 1 or claim 2 wherein Y is a 5 or 6 membered ring.

8. A composition comprising a metal chelate of Formula (1) as described in claim 1 and a liquid medium.

9. A composition according to claim 8 wherein the liquid medium is a mixture of water and organic solvent.

10. A composition according to claim 8 which is an ink suitable for use in an ink-jet printer.

11. A process for forming an image on a substrate comprising applying an ink according to claim 10 thereto by means of an ink-jet printer.

12. A material printed with a composition as described in claim 8.

13. An ink-jet printer cartridge comprising a chamber and an ink wherein the ink is in the chamber and the ink is as defined in claim 10 of the present invention.

14. A material printed with a metal chelate as described in claim 1.

* * * * *